*J. H. Rhodes,*
*Pipe Coupling.*
Nº 68,112.  Patented Aug. 27, 1867.
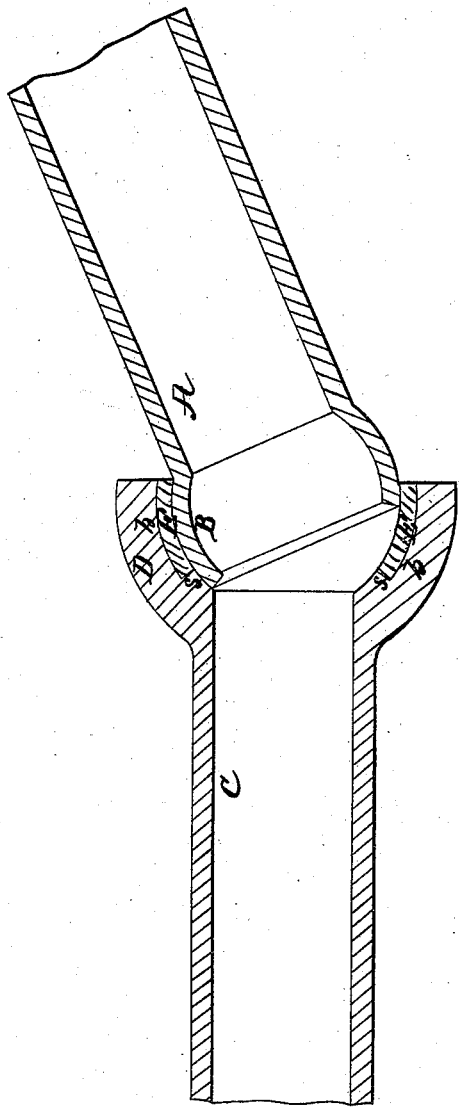
Witnesses.
J. W. Coombs
Geo. W. Reed
Inventor.
J. H. Rhodes
per
Brown, Coombs & Co.

United States Patent Office.

JOHN H. RHODES, OF BROOKLYN, NEW YORK.

Letters Patent No. 68,112, dated August 27, 1867.

IMPROVEMENT IN ADJUSTABLE PIPE-JOINTS.

*The Schedule referred to in these Letters Patent and making part of the same.*

TO ALL WHOM IT MAY CONCERN:

Be it known that I, JOHN H. RHODES, of Brooklyn, in the county of Kings, and State of New York, have invented a new and useful improvement in Joints for Water and other Pipes, of which the following is a full, clear, and exact description, reference being had to the accompanying drawing, forming part of this specification, and which represents a longitudinal section of two lengths of a pipe in part with their connecting termination or joint.

This, my improvement in pipe-joints, though applicable to pipes for conveying various fluids, gases, or vapor, is more especially designed to conduct along or over and across the beds of rivers, creeks, and so forth, where the establishment of the connection of the several lengths of pipe by cold joints is indispensable, and various angles are assumed throughout the whole length or run of the pipes or pipe sections. To meet this or these requirements, it has been customary to establish the connections by means of peculiarly constructed joints, including the attachment to the spigot, by grooves or indentations of a lead packing externally shaped to fit the inside contour of the bell; but such construction does not offer the requisite facilities for caulking, and in an extreme angle brings iron against iron to the risk of producing breakage, and is in other respect objectionable.

My improvement obviates these defects, and the nature of the invention consists in a combination of partially spherical-shaped spigot with a bell or mouth to the adjoining section, also of a corresponding form, and recessed at its outer end to receive within it a lead or other soft metal filling, which, at its back edge, is made to bear or rest against a stop or stops formed in the bell, and whereby the results sought to be obtained are secured.

Referring to the accompanying drawing, A represents the one-pipe section in part, terminating in a spigot, B, of the segment of a sphere in shape, the whole being made of iron or hard metal. C is the opposite section or length of pipe formed at its end adjacent to the section A of a bell, D, also of hard metal, and corresponding to the segment of a sphere, and into which the spigot B fits. This bell D is recessed as at $b$ for a limited depth from its mouth, terminating in a stop, S, and this recess, after the spigot B is inserted, filled with a lead or other soft metal or alloy packing, E. Thus constructed, it will be seen that but a small amount of lead or other soft metal is required to establish the packing, much less than would be necessary were the spigot, independently of the packing, straight, while, when the packing is inserted, the spigot is locked from being drawn outwards or being forced unduly inwards, and in any angle which the connection is capable of assuming there is no throttling of the flow, and the hard metal of the spigot B prevented under any sudden or other deflection or variation of it from coming in contact with the hard metal of the bell D, to endanger breakage or damage, but by said spigot striking the soft metal packing E on the one side, the shock or blow is eased and said packing forcibly pressed inwards against its bearing or stop S on the one side, which restrains any displacement of it on the opposite side, said packing also, in being a fixture, affording every facility for caulking at its inner and outer edges in front of the bell D, to make tight the joint whatever the angle assumed by the sections.

What is here claimed and desired to be secured by Letters Patent, is—

A pipe-joint constructed of a hard metal spigot, B, and hard metal bell D, both of shape corresponding to the segment of a sphere, in combination with the soft metal packing E, arranged as a fixture in the mouth of the bell, and resting at its inner end or edge against a projection or stop, S, substantially as and for the purpose or purposes herein set forth.

JOHN H. RHODES.

Witnesses:
J. W. COOMBS,
G. W. REED.